United States Patent
Takagimoto et al.

(10) Patent No.: US 9,218,012 B2
(45) Date of Patent: Dec. 22, 2015

(54) POWER SUPPLY DEVICE, VEHICLE-MOUNTED DEVICE, AND VEHICLE

(71) Applicant: Rohm Co., Ltd., Kyoto (JP)

(72) Inventors: Shinsuke Takagimoto, Kyoto (JP); Takayuki Nakashima, Kyoto (JP); Nobuhiro Nishikawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 296 days.

(21) Appl. No.: 13/888,817

(22) Filed: May 7, 2013

(65) Prior Publication Data

US 2013/0307435 A1 Nov. 21, 2013

(30) Foreign Application Priority Data

May 14, 2012 (JP) ................................. 2012-110251

(51) Int. Cl.
  *G05F 1/46* (2006.01)
  *H05B 33/08* (2006.01)
  *H02M 1/36* (2007.01)
  *H02M 3/158* (2006.01)

(52) U.S. Cl.
  CPC ............ *G05F 1/468* (2013.01); *H05B 33/0815* (2013.01); *H05B 33/0818* (2013.01); *H02M 1/36* (2013.01); *H02M 3/1582* (2013.01)

(58) Field of Classification Search
  CPC ............................ G05F 1/468; H05B 33/0818
  USPC ...................................... 315/224; 307/80, 9.1
  See application file for complete search history.

(56) References Cited

U.S. PATENT DOCUMENTS

| | | | |
|---|---|---|---|
| 7,034,586 B2 * | 4/2006 | Mehas et al. | 327/143 |
| 7,847,532 B2 * | 12/2010 | Potter et al. | 323/283 |
| 8,188,618 B2 * | 5/2012 | Hori | 307/80 |
| 2008/0079315 A1 * | 4/2008 | Motomori et al. | 307/43 |
| 2009/0273324 A1 | 11/2009 | Okamoto et al. | |

FOREIGN PATENT DOCUMENTS

WO  2006/068012  6/2006

* cited by examiner

*Primary Examiner* — Dinh Le
(74) *Attorney, Agent, or Firm* — Fish & Richardson P.C.

(57) ABSTRACT

A power-supply device has a first power supply circuit adapted to generate from an input voltage a first output voltage and a second power supply circuit adapted to generate from the first output voltage a second output voltage. The second power supply circuit monitors the first output voltage to check if it is higher than a first threshold voltage, and also monitors the first power-supply circuit to check if it has started operation for generating the first output voltage, so that the second power supply circuit stays on stand-by, even when the first output voltage is higher than the first threshold voltage, until the first power supply circuit starts operation for generating the first output voltage.

13 Claims, 15 Drawing Sheets

POWER SUPPLY DEVICE, VEHICLE-MOUNTED DEVICE, AND VEHICLE

CROSS-REFERENCE TO RELATED APPLICATIONS

This application is based on the following Japanese Patent Application, and the contents of which are hereby incorporated by reference:

(1) Japanese Patent Application No. 2012-110251 (the filing date: May 14, 2012)

BACKGROUND OF THE INVENTION

1. Field of the Invention

The present invention relates to a power-supply device, and to a vehicle-mounted device and a vehicle that incorporate the power-supply device.

2. Description of Related Art

Conventionally, a system power-supply device which generates a plurality of output voltages from an input voltage is in practical use. In addition, conventionally, besides the above system power-supply device, many power-supply devices have a soft start function for gradually raising an output voltage during a startup time.

In the meantime, as an example of prior art related to the above description, there is international publication No. 2006/068012 brochure.

But, in the conventional system power-supply device, a startup sequence of a plurality of power-supply circuits has a problem (elimination of an unusual output and arbitrary setting of a startup procedure) to be solved. Besides, in the conventional power-supply device, the soft start function has a problem (reduction in soft start duration) to be solved.

SUMMARY OF THE INVENTION

It is an object of the present invention to provide a power-supply device that is able to solve the problems with the startup sequence and the soft start function, and to a vehicle-mounted device and a vehicle that incorporate the power-supply device.

To solve the above problems, a power-supply device disclosed in the present specification is structured to include: a first power-supply circuit that generates a first output voltage from an input voltage; and a second power-supply circuit that generates a second output voltage from the first output voltage, wherein the second power-supply circuit monitors whether the first output voltage is larger than a first threshold value voltage or not, monitors whether a generation operation of the first output voltage is started in the first power-supply circuit or not, and waits until the generation operation of the first output voltage is started in the first power-supply circuit without starting a generation operation of the second output voltage even if the first output voltage is larger than the first threshold value voltage.

Besides, the power-supply device disclosed in the present specification is structured to include: a power-supply device that generates an output voltage from an input voltage and supplies the output voltage to a light emitting diode; and a turning on/off circuit that turns on/off a driving current for the light emitting diode, wherein the turning on/off circuit monitors whether the output voltage is larger than a predetermined threshold value voltage or not, monitors a generation operation of the output voltage is started in the power-supply circuit or not, and waits until the generation operation of the output voltage is started in the power-supply circuit without turning on the driving current even if the output voltage is larger than the threshold value voltage.

Besides, the power-supply device disclosed in the present specification is structured to include: an output portion that drives a switch device to generate the output voltage from the input voltage; a feedback voltage generation portion that generates a feedback voltage in accordance with the output voltage; a soft start voltage generation portion that generates a soft start voltage which rises gradually after a startup; an error amplifier that generates an error voltage in accordance with a difference between a lower one of a predetermined reference voltage and the soft start voltage and the feedback voltage; a slope voltage generation portion that generates a serrate or triangular slope voltage; and a pulse signal generation portion that generates the pulse signal for driving a soft switch device in accordance with a comparison result between the error voltage and the slope voltage, wherein the soft start voltage generation portion includes a pulse signal detection portion that detects the pulse signal; the soft start voltage is raised at a first inclination before detection of the pulse signal; and the soft start voltage is raised at a second inclination more gradual than the first inclination after the detection of the pulse signal.

According to the present invention, it is possible to solve the problems with the startup sequence and soft start function.

In the meantime, other features, elements, steps, advantages, and characteristics of the present invention will become more apparent from the following detailed description of preferred embodiments of the present invention with reference to the attached drawings.

DETAILED DESCRIPTION OF PREFERRED EMBODIMENTS

Power-Supply Device

Figure 1:
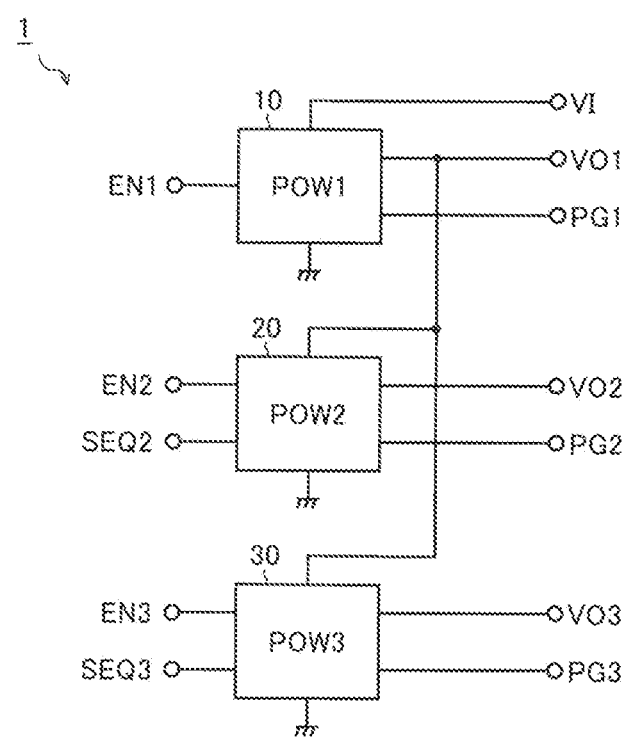
FIG. 1 is a block diagram showing a structural example of a power-supply device 1.

FIG. 1 is a block diagram showing a structural example of a power-supply device 1. The power-supply device 1 of the present structural example is a system power-supply IC (e.g., vehicle-mounted system power-supply IC) which has: a power-supply circuit 10 that generates an output voltage VO1 from an input voltage VI; a power-supply circuit 20 that generates an output voltage VO2 from the output voltage VO1; and a power-supply circuit 30 that generates an output voltage VO3 from the output voltage VO1.

The power-supply circuits 10 to 30 each are provided with enable terminals EN1 to EN3 and power good terminals PG1 to PG3. Besides, the power-supply circuits 20 and 30 are provided with startup sequence setting terminals SEQ2 and SEQ3. These external terminals are described in detail later. Besides, the power-supply device 1 is also provided with various protection circuits (not shown) such as a thermal shutdown circuit and the like.

First Embodiment

Figure 2:
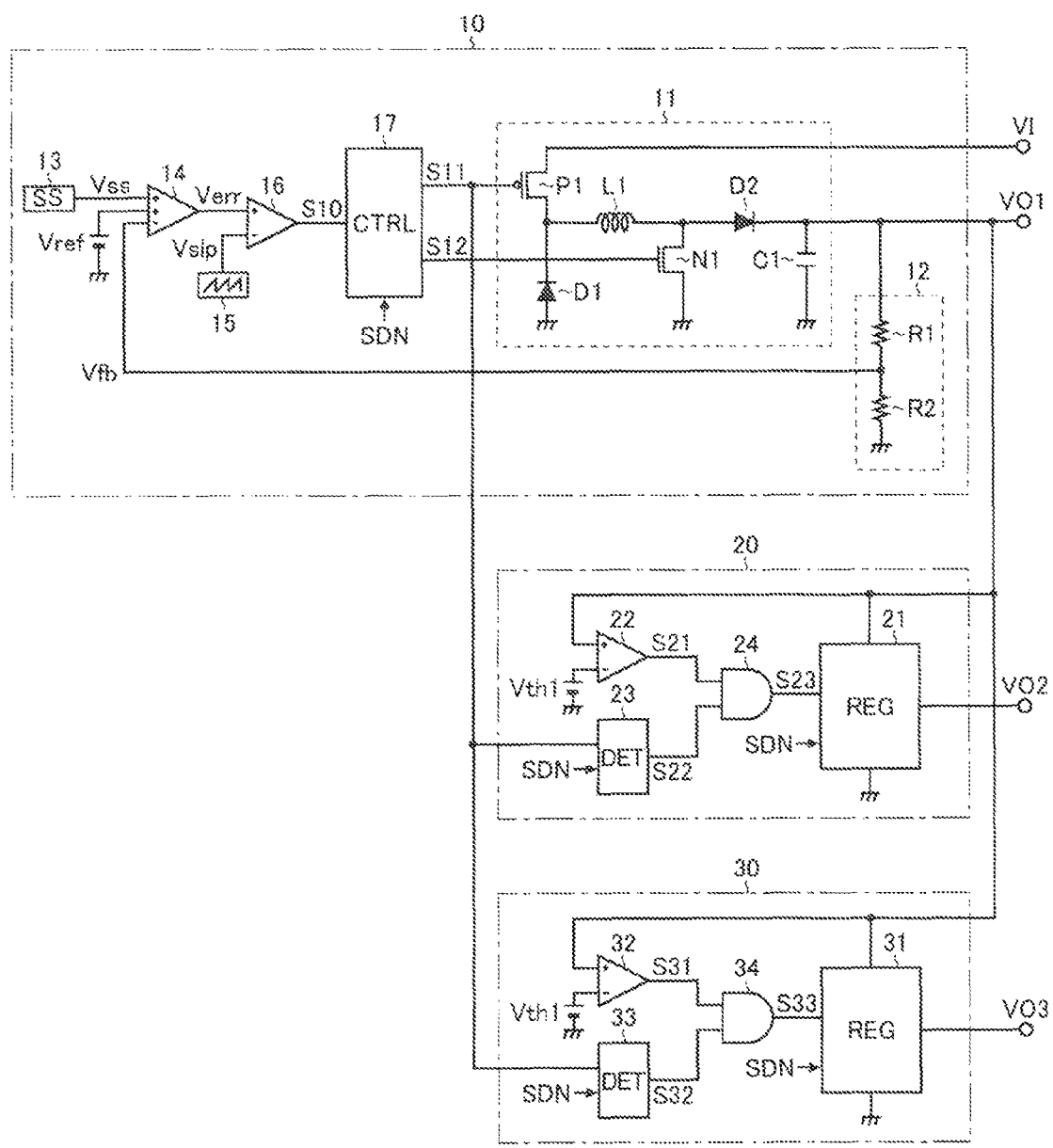
FIG. 2 is a main-portion structural diagram of power-supply circuits 10 to 30.

FIG. 2 is a main-portion structural diagram of the power-supply circuits 10 to 30. The power-supply circuit 10 includes: an output portion 11; a feedback voltage generation portion 12; a soft start voltage generation portion 13; an error amplifier 14; a slope voltage generation portion 15; a comparator 16; and a control portion 17.

The output portion 11 is a circuit block that steps up or steps down the input voltage VI to generate the output voltage VO1 by driving a switch device, and includes: a P channel type MOS [metal oxide semiconductor] field effect transistor P1 (voltage stepping-down switch device); an N channel type MOS field effect transistor N1 (voltage stepping-up switch device); a coil L; diodes D1 and D2; and a capacitor C1. In the meantime, in a case where as the input voltage VI, an output voltage (about 4 to 40 V) from a vehicle battery is directly input, it is necessary to use a high breakdown-voltage device as a device that forms the output portion 11.

A source of the transistor P1 is connected to an application terminal for the input voltage VI. A drain of the transistor P1 is connected to a first terminal of the coil L and to a cathode of the diode D1. A gate of the transistor P1 is connected to an application terminal for a pulse signal S11. An anode of the diode D1 is connected to a ground terminal. A second terminal of the coil L is connected to an anode of the diode D2 and to a drain of the transistor N1. A source of the transistor N1 is connected to the ground terminal. A gate of the transistor N1 is connected to an application terminal for a pulse signal S12. A cathode of the diode D2 is connected to an application terminal for the output voltage VO1 and to a first terminal of the capacitor C1. A second terminal of the capacitor C1 is connected to the ground terminal.

The transistor P1 is turned off when the pulse signal S11 is at a high level and turned on when the pulse signal S11 is at a low level. On the other hand, the transistor N1 is turned on when the pulse signal S12 is at a high level and turned off when the pulse signal S12 is at a low level.

The diode D1 is equivalent to a first rectification device and also replaceable with a first synchronous rectification transistor that is turned on/off in a complementary manner (exclusively) with the transistor P1. Besides, the diode D2 is equivalent to a second rectification device and also replaceable with a second synchronous rectification transistor that is turned on/off in a complementary manner (exclusively) with the transistor N1. In the meantime, the term "complementary (exclusive)" used in the present specification covers a case where an output transistor and a synchronous rectification transistor are completely reverse to each other in on/off state and also a case where a predetermined delay is given to on/off transition timing of both transistors from a viewpoint of preventing a through-current (case where a simultaneous turning-on prevention duration for both transistors is provided).

The feedback voltage generation portion 12 is a resistor division circuit that generates a feedback voltage Vfb (divided voltage of the output voltage VO1) in accordance with the output voltage VO1, and includes resistors R1 and R 2 connected in series between the application terminal for the output voltage VO1 and the ground terminal. The feedback voltage Vfb is output from a connection node between the resistor R1 and the resistor R2.

After a startup of the power-supply circuit 10, the soft start voltage generation portion 13 generates a soft start voltage Vss that gradually rises. A structure and operation of the soft start voltage generation portion 13 are described in detail later.

The error amplifier 14 generates an error voltage Verr in accordance with a difference between a lower one of the reference voltage Vref and the soft start voltage Vss respectively applied to two non-inverting input terminals (+) and the feedback voltage Vfb applied to an inverting input terminal (−). In the meantime, the error amplifier 14 is structured to keep the error voltage Verr at a lower limit value until the difference between the soft start voltage Vss and the feedback voltage Vfb becomes larger than a predetermined input offset value Vofs in a soft start duration (Vss<Vref) disposed immediately after the startup of the power-supply circuit 10. By employing such structure, after the startup of the power-supply circuit 10, a pulse signal S10 described later is kept at a low level; accordingly, it becomes possible to prevent unusual outputs (unintentional impulse output of the output voltage VO1 and the like) at the startup time.

The slope voltage generation portion 15 generates a serrate or triangular slope voltage Vslp. In the meantime, a lower limit value of the slope voltage Vslp is set higher than the lower limit value of the error voltage Verr, and an upper limit value of the slope voltage Vslp is set lower than an upper limit value of the error voltage Verr.

Figure 3:
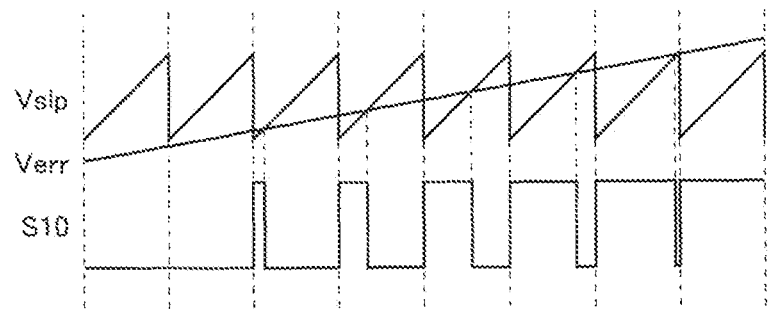
FIG. 3 is a waveform diagram for describing a generation operation of a pulse signal S10.

The comparator 16 compares the error voltage Verr applied to a non-inverting input terminal (+) and the slope voltage Vslp applied to an inverting input terminal (−) with each other to generate a pulse signal S10. The pulse signal S10 goes to a high level when the error voltage Verr is larger than the slope voltage Vslp, and goes to a low level when the error voltage Verr is lower than the slope voltage Vslp. Accordingly, the higher the error voltage Verr is, the larger a duty (percentage of a high level duration to one period) of the pulse signal S10 becomes, and reversely, the lower the error voltage Verr is, the smaller the duty becomes (see FIG. 3).

Based on the pulse signal S10, the control portion 17 generates pulse signals S11 and S12 for turning on/off the transistors P1 and N1. In the meantime, the control portion 17 may be structured to generate the pulse signals S11 and S12 to synchronously turn on/off the transistors P1 and N1 irrespective of a magnitude relationship between the input voltage VI and the output voltage VO1, or may be structured to generate the pulse signal S11 and S12 such that if the input voltage VI is lower than the output voltage VO1, a voltage step-up mode comes into effect in which the transistor P1 is normally kept in the on-state and only the transistor N1 is turned on/off; and if the input voltage VI is lower than the output voltage VO1, a voltage step-down mode comes into effect in which the transistor N1 is normally kept in the off-state and only the transistor P1 is turned on/off. Besides, the control portion 17 has also a function to forcibly stop the generation operation of the output voltage VO1 in accordance with a shutdown signal SDN. The shutdown signal SDN goes to a high level at a shutdown time of the power-supply device 1 and goes to a low level at a shutdown elimination time of the power-supply device 1.

In the meantime, in the power-supply circuit 10 of the present structural example, the output portion 11 is of voltage step-up/down type, but the form of the output portion 11 is not limited to this, but may be of voltage step-up type or voltage step-down type.

The power-supply circuit 20 includes: a regulator portion 21; a comparator 22; a pulse signal detection portion 23; and an AND gate 24.

The regulator portion 21 is a circuit block that generates the output voltage VO2 from the output voltage VO1, and the generation operation of the output voltage VO2 is controlled in accordance with an output permission signal S23 from the AND gate 24. Besides, the regulator portion 21 has also a function to forcibly stop the generation operation of the output voltage VO2 in accordance with the shutdown signal SDN. In the meantime, the input voltage VI (4 to 40 V) is not directly applied to the regulator portion 21; accordingly, as a device that forms the regulator portion 21, it is sufficient to use an intermediate breakdown-voltage device or a low breakdown-voltage device that are able to endure the application of the output voltage VO1.

The comparator 22 compares the output voltage VO applied to a non-inverting input terminal (+) and a threshold value voltage Vth1 applied to an inverting input terminal (−) with each other to generate a reduced voltage detection signal S21. The reduced voltage detection signal S21 goes to a high level when the output voltage VO1 is higher than the threshold value voltage Vth1, and goes to a low level when the output voltage VO1 is lower than the threshold value voltage Vth1.

The pulse signal detection portion 23 detects the pulse signal S11 for driving the transistor P1 to generate a pulse detection signal S22. The pulse detection signal S22 is triggered by a falling edge (or rising edge) of the pulse signal S11 to be latched at a high level. Besides, the pulse detection signal S22 is triggered by a rising edge of the shutdown signal SDN to be latched at a low level. In other words, the pulse detection signal S22 goes to the high level when the generation operation of the output voltage VO1 is started in the power-supply circuit 10, and goes to the low level when the power-supply device 1 is shut down. In the meantime, in the present structural example, the pulse signal S11 is targeted for monitoring, but it is also possible to target the pulse signal S10 and the pulse signal S12 for monitoring. As the pulse signal detection portion 23, an SR flip-flop and the like may be used.

The AND gate 24 generates an output permission signal S23 by performing logical product calculation of the reduced voltage detection signal S21 and the pulse detection signal S22. The output permission signal S23 goes to a high level (logical level at an output permission time) when both the reduced voltage detection signal S21 and the pulse detection signal S22 are at the high level, and goes to a low level (logical level at an output prohibition time) when at least one of the reduced voltage detection signal S21 and the pulse detection signal S22 is at the low level.

Figure 4:
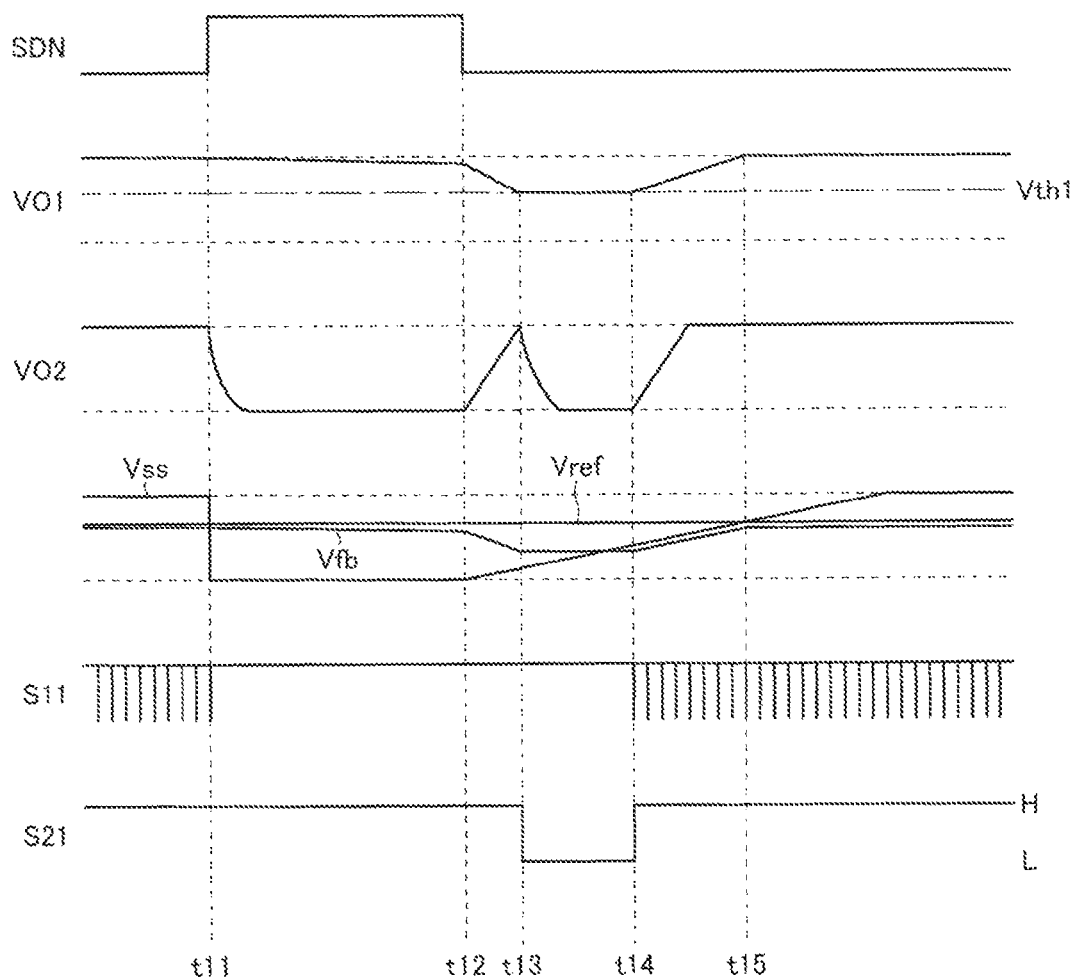
FIG. 4 is a time chart showing a first example (with no switching standby) of a VO2 startup operation.
Figure 5:
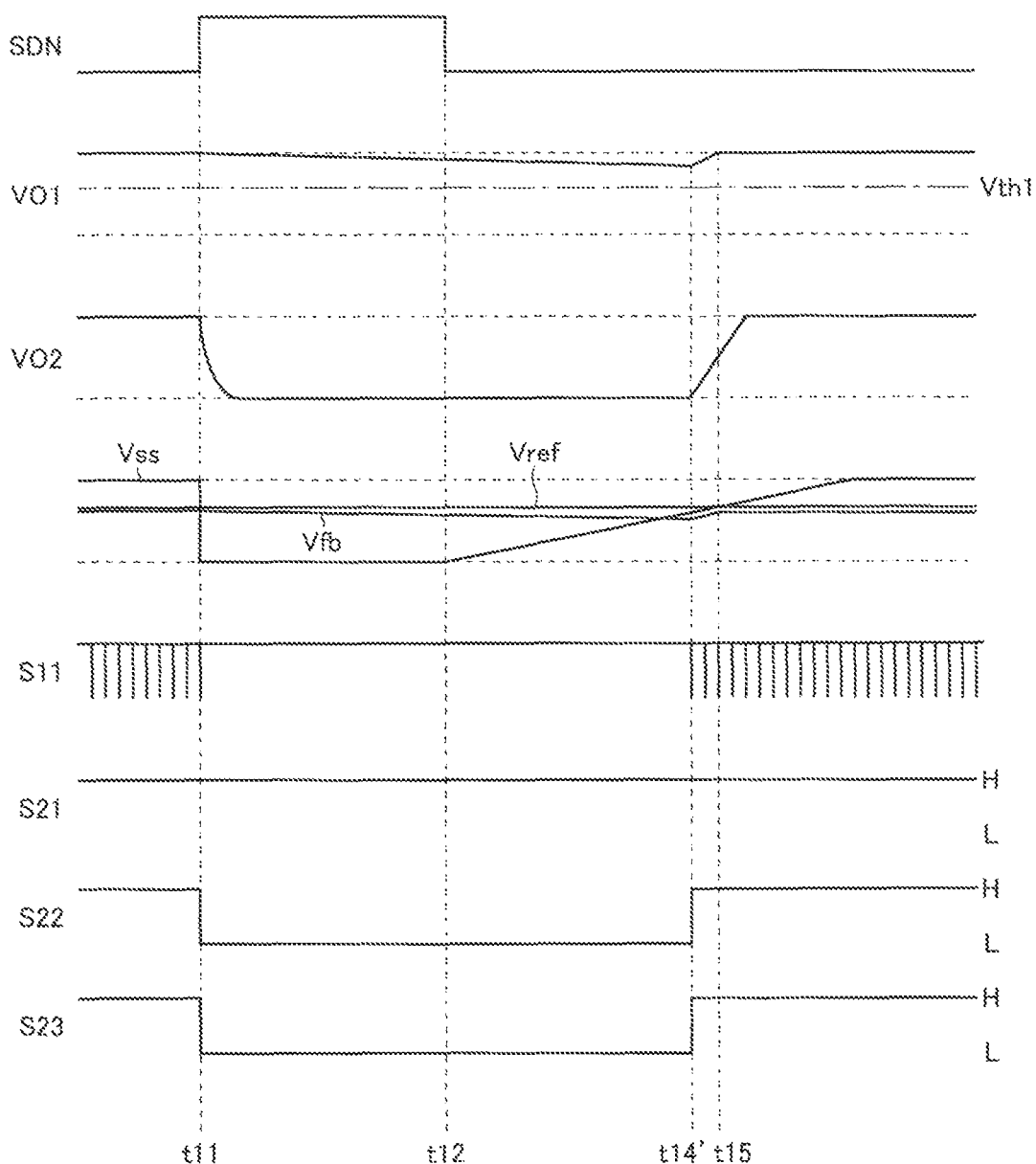
FIG. 5 is a time chart showing a second example (with switching standby) of the VO2 startup operation.

Next, the significance of providing the pulse signal detection portion 23 is described comparing and referring to FIG. 4 and FIG. 5.

First, referring to FIG. 4, the VO2 startup operation in a case where the power-supply circuit 20 is not provided with the pulse signal detection portion 23 is described as a comparative example. FIG. 4 is a time chart showing a first example (with no switching standby) of the VO2 startup operation in the power-supply circuit 20, and, in order from top, illustrates: the shutdown signal SDN; the output voltage VO1; the output voltage VO2; various voltages (the soft start voltage Vss, the reference voltage Vref, and the feedback voltage Vfb) of the power-supply circuit 10; the pulse signal S11; and the reduced voltage detection signal S21.

If unusual temperature, sudden power-supply shutdown or the like of the power-supply device 1 is detected and the shutdown signal SDN is raised to the high level at a time point t11, the generation operation of both the output voltages VO1 and VO2 is forcibly stopped. At this time, the output voltage VO2 supplied to loads such as a microcomputer and the like is discharged relatively rapidly as long as power supply routes from the power-supply circuit 20 to the loads are not shut down. On the other hand, the output voltage VO1 supplied to only the power-supply circuits 20 and 30 loses its discharge route because of the forcible stop of the power-supply circuits 20 and 30; accordingly, the output voltage VO1 goes to a state to be substantially kept at a voltage level before the shutdown. Therefore, the reduced voltage detection signal S21 of the power-supply circuit 20 is kept at the high level even after the power-supply circuit 10 is forcibly shut down. Besides, at the time point t11, the soft start voltage Vss of the power-supply circuit 10 is reset to a lower limit value (0 V), but the feedback voltage Vfb goes to a state to be kept at the substantially same value as the reference voltage Vref.

Thereafter, if the unusual state of the power-supply device 1 is eliminated and the shutdown signal SDN is dropped to the low level at a time point t12, a soft start operation for generation resumption of the output voltage VO1 is started in the power-supply circuit 10. But the feedback voltage Vfb is higher than the soft start voltage Vss at the time point t12; accordingly, the pulse signal S11 goes to a state to be kept at the high level (state where the generation operation of the output voltage VO1 is not actually resumed).

On the other hand, if the shutdown signal SDN is dropped to the low level at the time point t12, the power-supply circuit 20, responding to that the reduced voltage detection signal S21 is kept at the high level, resumes the generation operation of the output voltage VO2. But as described above, at this time point, the generation operation of the output voltage VO1 by the power-supply circuit 10 is not actually resumed; accordingly, the output voltage VO1 rapidly declines and goes to a state to become lower than the threshold value voltage Vth1 at a time point t13. As a result of this, the reduced voltage detection signal S21 falls to the low level; therefore, the generation operation of the output voltage VO2 is stopped in the power-supply circuit 20 and the output voltage VO2 begins to decline again. In the meantime, because of the stop of the power-supply circuit 20, the discharge route for the output voltage VO1 is lost again; accordingly, the output voltage VO1 goes to a state to be kept at a voltage value slightly lower than the threshold value voltage Vth1.

Thereafter, at a time point t14, if the soft start voltage Vss of the power-supply circuit 10 becomes larger than the feedback voltage Vfb, pulse driving by the pulse signal S11 is started, and the generation operation of the output voltage VO1 by the output portion 11 is started. The output voltage VO1, upon beginning to rise at the time point t14, becomes larger than the threshold value voltage Vth1 at the substantially same time point, and further reaches a predetermined target value at a time point t15. Besides, if the output voltage VO1 becomes larger than the threshold value voltage Vth1 at the time point t14, the reduced voltage detection signal S21 of the power-supply circuit 20 is raised to the high level and the generation operation of the output voltage VO2 is resumed.

As described above, in the case where the power-supply circuit 20 is not provided with the pulse signal detection portion 23, the unnecessary start/stop (time points t12 to t13) occur in the generation operation of the output voltage VO2; accordingly, there is a risk that the microcomputer and the like could malfunction. In the meantime, as one of approaches to solve such problem, there is a structure in which a discharge transistor for the output voltage VO1 is provided. But, in a case where the structure is employed, the discharge duration of the output voltage VO1 depends on the capacity value of the capacitor C1 and the discharge capability of the discharge transistor; accordingly, to rapidly discharge the output voltage VO1, it is necessary to use a high breakdown-voltage discharge transistor that has a large size; therefore, there is another problem that the number of pins and the mount area rise to incur cost increase.

Next, referring to FIG. 5, the VO2 startup operation in a case where the power-supply circuit 20 is provided with the pulse signal detection portion 23 is described. FIG. 5 is a time chart showing a second example (with switching standby) of the VO2 startup operation in the power-supply circuit 20, and, in order from top, illustrates: the shutdown signal SDN; the output voltage VO1; the output voltage VO2; various voltages (the soft start voltage Vss, the reference voltage Vref, and the feedback voltage Vfb) of the power-supply circuit 10; the pulse signal S11; the reduced voltage detection signal S21; the pulse detection signal S22; and the output permission signal S23.

Like in FIG. 4, if the shutdown signal SDN is raised to the high level at the time point t11, the generation operations of both the output voltages VO1 and VO2 are forcibly stopped. At this time, the output voltage VO2 is discharged relatively rapidly and the output voltage VO1 goes to the state to be substantially kept at the voltage level before the shutdown, which is as described above. In the meantime, at the time point t11, the reduced voltage detection signal S21 is kept at the high level, but the pulse detection signal S22 is reset to the low level; accordingly, the output permission signal S23 also goes to the low level.

Thereafter, if the shutdown signal SDN is dropped to the low level at the time point t12, a soft start operation for the generation resumption of the output voltage VO1 is started in the power-supply circuit 10. But, the feedback voltage Vfb is higher than the soft start voltage Vss at the time point t12; accordingly, the pulse signal S11 goes to the state to be kept at the high level (state where the generation operation of the output voltage VO1 is not actually resumed). This point is as described above.

On the other hand, when the shutdown signal SDN is dropped to the low level at the time point t12, in the power-supply circuit 20, responding to that the output voltage VO1 is larger than the threshold value voltage Vth1, the reduced voltage detection signal S21 is kept at the high level, while responding to that the pulse driving by the pulse signal S11 is not started, the pulse detection signal S22 is kept at the low level. Therefore, the output permission signal S23 is kept at the low level, and the generation operation of the output voltage VO2 is not resumed but waited.

Thereafter, at a time point t14', if the soft start voltage Vss of the power-supply circuit 10 becomes larger than the feedback voltage Vfb, the pulse driving by the pulse signal S11 is started, and the generation operation of the output voltage VO1 by the output portion 11 is started. As a result of this, the output voltage VO1 begins to rise at the time point t14' and reaches a predetermined target value at the time point t15. Besides, if the pulse driving by the pulse signal S11 is started at the time point t14', the pulse detection signal S22 of the power-supply circuit 20 is raised to the high level; accordingly, the output permission signal S23 also is raised to the high level, and the generation operation of the output voltage VO2 is resumed. In the meantime, a duration, which is required from the time the shutdown signal SDN is dropped to the low level to the time the output voltage VO1 reaches the predetermined target value, becomes constant irrespective of whether the power-supply circuit 20 is provided with the pulse signal detection portion 23 or not.

As described above, the power-supply circuit 20 is structured to monitor whether the output voltage VO1 is larger the threshold value voltage Vth1 or not, to monitor whether the generation operation of the output voltage VO1 is started in the power-supply circuit 10 or not, and to wait until the generation operation of the output voltage VO1 is started in the power-supply circuit 10 without starting the generation operation of the output voltage VO2 even if the output voltage VO1 is larger than the threshold value voltage Vth1.

By employing such structure, it is possible to eliminate the start/stop (see the time points t12 to t13 of FIG. 4) unnecessary for the generation operation of the output voltage VO2; accordingly, it becomes possible to raise the stability and reliability of the system. Besides, the discharge transistor for the output voltage VO1 becomes unnecessary; therefore, it also becomes possible to achieve cost reduction by reducing the number of pins and the mount area.

In the meantime, the structure of the power-supply circuit 30 is basically the same structure as the power-supply circuit 20, and the reference numbers "20" to "24", "VO2", and "S21" to "S23" in the above description are respectively replaced with "30" to "34", "VO3", and "S31" to "S33" to sufficiently understand.

Modification of the First Embodiment

Figure 6:
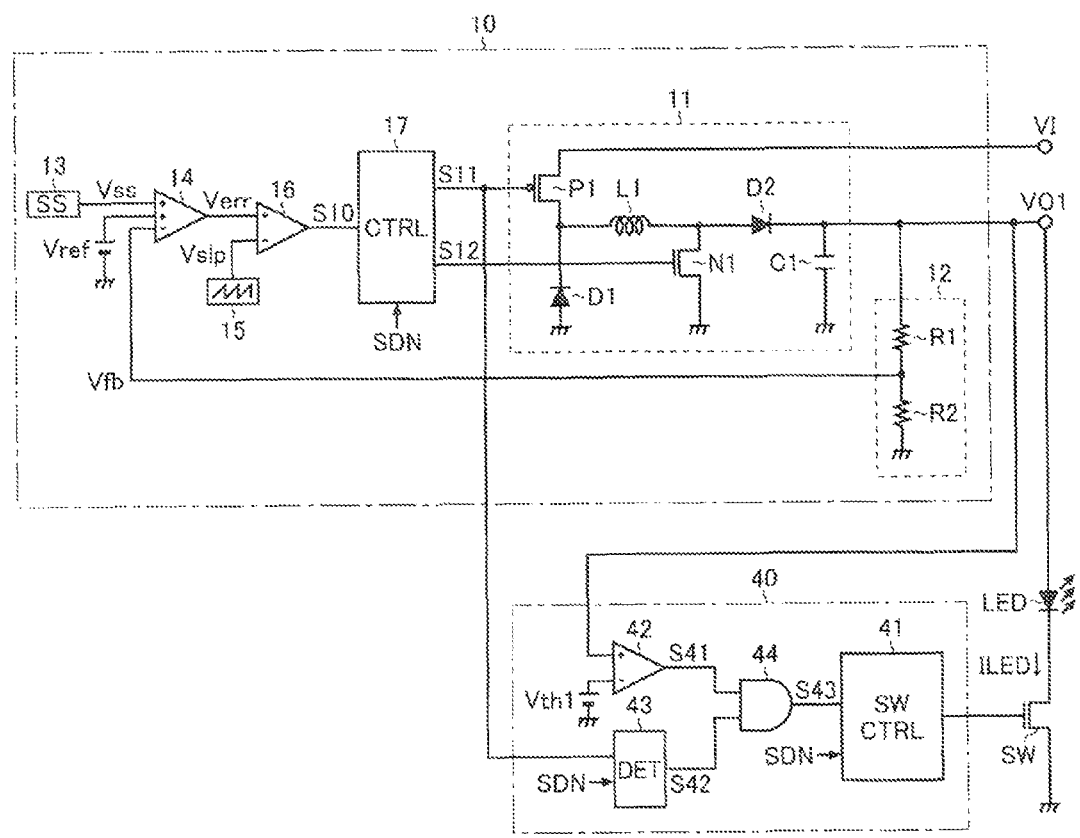
FIG. 6 is a main-portion structural diagram showing an example of application to a turning on/off circuit 40.

FIG. 6 is a main-portion structural diagram showing an example of application to a turning on/off circuit 40. The power-supply device 1 of the present modification has: the power-supply circuit 10 that generates the output voltage VO1 from the input voltage VI and supplies the output voltage VO1 to an anode of a light emitting diode LED; a switch. SW (N channel type MOS field effect transistor) that performs connection/disconnection between a cathode of the light emitting diode LED and a ground terminal; and the turning on/off circuit 40 that controls the switch SW to turn on/off a driving current ILED for the light emitting diode LED.

The power-supply circuit 10 is the same as that of FIG. 2. Besides, of a switch control portion 41, a comparator 42, a pulse signal detection portion 43 and an AND gate 44 that are included in the turning on/off circuit 40, the components other than the switch control portion 41 are the same as the comparator 22, the pulse signal detection portion 23 and the AND gate 24 of FIG. 2.

The switch control portion 41 is a circuit block that generates a driving signal for the switch SW, and driving of the switch SW is controlled in accordance with an output permission signal S43 from the AND gate 44. Besides, the switch control portion 41 has also a function to forcibly turn off the switch SW in accordance with the shutdown signal SDN.

Figure 7:
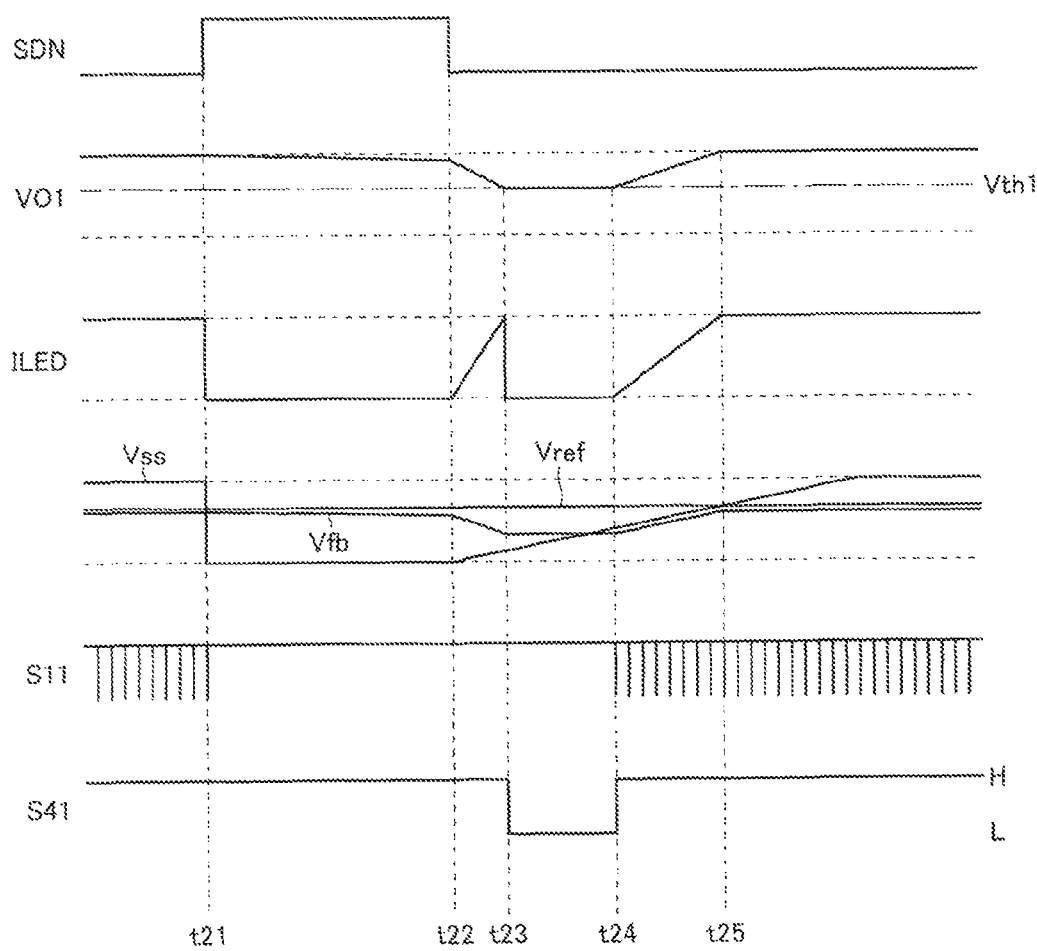
FIG. 7 is a time chart showing a first example (with no switching standby) of an ILED startup operation.
Figure 8:
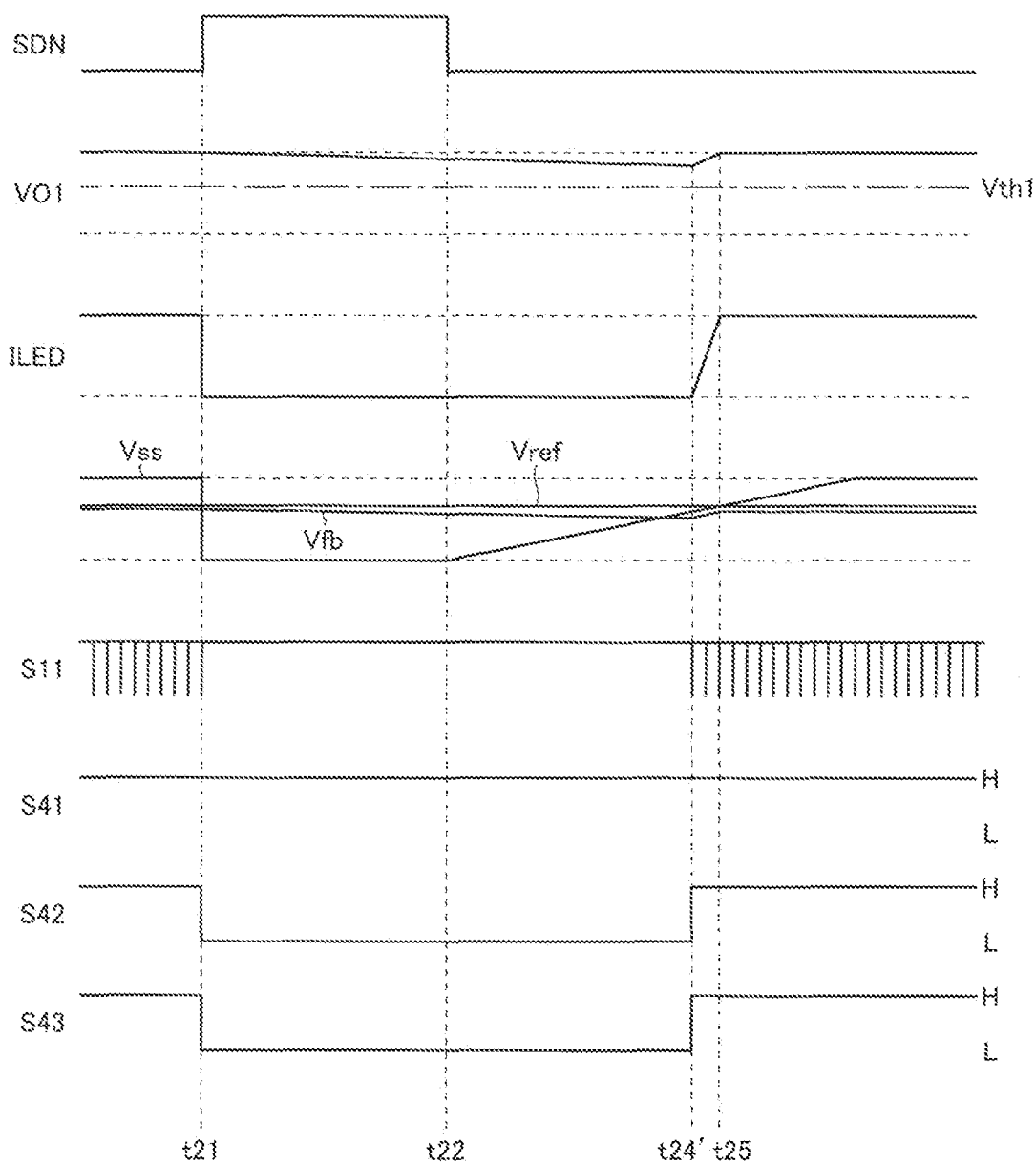
FIG. 8 is a time chart showing a second example (with switching standby) of the ILED startup operation.

Next, the significance of providing the pulse signal detection portion 43 is described comparing and referring to FIG. 7 and FIG. 8.

First, referring to FIG. 7, the ILED startup operation in a case where the turning on/off circuit 40 is not provided with the pulse signal detection portion 43 is described as a comparative example. FIG. 7 is a time chart showing a first example (with no switching standby) of the ILED startup operation in the turning on/off circuit 40, and, in order from top, illustrates: the shutdown signal SDN; the output voltage VO1; the driving current ILED; various voltages (the soft start voltage Vss, the reference voltage Vref, and the feedback voltage Vfb) of the power-supply circuit 10; the pulse signal S11; and the reduced voltage detection signal S41.

If unusual temperature, sudden power-supply shutdown or the like of the power-supply device 1 are detected and the shutdown signal SDN is raised to the high level at a time point t21, the generation operation of the output voltage VO1 is forcibly stopped, the switch SW is forcibly turned off, and the supply of the driving current ILED is stopped. At this time, the output voltage VO1 supplied to the anode of the light emitting diode LED loses its discharge route because of the forcible turning-off of the switch SW; accordingly, the output voltage VO1 goes to a state to be substantially kept at a voltage level before the shutdown. Therefore, the reduced voltage detection signal S41 of the turning on/off circuit 40 is kept at the high level even after the power-supply circuit 10 is forcibly stopped. Besides, at the time point t21, the soft start voltage Vss of the power-supply circuit 10 is reset to the lower limit value (0 V), but the feedback voltage Vfb goes to a state to be kept at the substantially same value as the reference voltage Vref.

Thereafter, if the unusual state of the power-supply device 1 is eliminated and the shutdown signal SDN is dropped to the low level at a time point t22, a soft start operation for generation resumption of the output voltage VO1 is started in the power-supply circuit 10. But, the feedback voltage Vfb is higher than the soft start voltage Vss at the time point t22; accordingly, the pulse signal S11 goes to a state to be kept at the high level (state where the generation operation of the output voltage VO1 is not actually resumed).

On the other hand, if the shutdown signal SDN is dropped to the low level at the time point t22, the turning on/off circuit 40, responding to that the reduced voltage detection signal S41 is kept at the high level, turns on the switch SW to start the supply of the driving current ILED to the light emitting diode LED. But, as described above, at this time point, the generation operation of the output voltage VO1 by the power-supply circuit 10 is not actually resumed, accordingly, the output voltage VO1 rapidly declines and goes to a state to become lower than the threshold value voltage Vth1 at a time point t23. As a result of this, the reduced voltage detection signal. S41 falls to the low level; therefore, the switch SW is turned off in the turning on/off circuit 40 and the supply of the driving current ILED is stopped again. In the meantime, because of the turning-off of the switch SW, the discharge route for the output voltage VO1 is lost again; accordingly, the output voltage VO1 goes to a state to be kept at a voltage value slightly lower than the threshold value voltage Vth1.

Thereafter, at a time point t24, if the soft start voltage Vss of the power-supply circuit 10 becomes larger than the feedback voltage Vth, the pulse driving by the pulse signal S11 is started, and the generation operation of the output voltage VO1 by the output portion 11 is started. The output voltage VO1, upon beginning to rise at the time point t24, becomes larger than the threshold value voltage Vth1 at the substantially same time point, and further reaches a predetermined target value at a time point t25. Besides, if the output voltage VO1 becomes larger than the threshold value voltage Vth1 at the time point t24, the reduced voltage detection signal S41 of the turning on/off circuit 40 is raised to the high level and the switch SW is turned on.

As described above, in the case where the turning on/off circuit 40 is not provided with the pulse signal detection portion 43, the unnecessary start/stop (time points t12 to t13) occur in the supply operation of the driving current ILED; accordingly, there is a risk that the light emitting diode LED could be erroneously turned on to be recognized as a flicker. In the meantime, as one of approaches to solve such problem, as described above, there is a structure in which a discharge transistor for the output voltage VO1 is provided. But, in a case where the structure is employed, the discharge duration of the output voltage VO1 depends on the capacity value of the capacitor C1 and the discharge capability of the discharge transistor; accordingly, to rapidly discharge the output voltage VO1, it is necessary to use a high breakdown-voltage discharge transistor that has a large size; therefore, there is another problem that the number of pins and the mount area rise to incur cost increase.

Next, referring to FIG. 8, the ILED startup operation in a case where the turning on/off circuit 40 is provided with the pulse signal detection portion 43 is described. FIG. 8 is a time chart showing a second example (with switching standby) of the ILED startup operation in the turning on/off circuit 40, and in order from top, illustrates: the shutdown signal SDN; the output voltage VO1; the driving current ILED; various voltages (the soft start voltage Vss, the reference voltage Vref, and the feedback voltage Vfb) of the power-supply circuit 10; the pulse signal S11; the reduced voltage detection signal S41; the pulse detection signal S42; and the output permission signal S43.

Like in FIG. 7, if the shutdown signal SDN is raised to the high level at the time point t21, the generation operation of the output voltage VO1 is forcibly stopped, the switch SW is forcibly turned off and the supply of the driving current ILED to the light emitting diode LED is stopped. At this time, the output voltage VO1 is substantially kept at the voltage level before the shutdown, which is as described above. In the meantime, at the time point t21, the reduced voltage detection signal S41 is kept at the high level, but the pulse detection signal S42 is reset to the low level; accordingly, the output permission signal S43 also goes to the low level.

Thereafter, if the shutdown signal SDN is dropped to the low level at the time point t22, a soft start operation for the generation resumption of the output voltage VO1 is started in the power-supply circuit 10. But, the feedback voltage Vfb is higher than the soft start voltage Vss at the time point t22; accordingly, the pulse signal S11 goes to the state to be kept at the high level (state where the generation operation of the output voltage VO1 is not actually resumed). This point is as described above.

On the other hand, when the shutdown signal SDN is dropped to the low level at the time point t22, in the turning on/off circuit 40, responding to that the output voltage VO1 is larger than the threshold value voltage Vth1, the reduced voltage detection signal S41 is kept at the high level, while responding to that the pulse driving by the pulse signal S11 is not started, the pulse detection signal S42 is kept at the low level. Therefore, the output permission signal S43 is kept at the low level; accordingly, the switch SW is kept at the off-state.

Thereafter, at a time point t24', if the soft start voltage Vss of the power-supply circuit 10 becomes larger than the feedback voltage Vfb, the pulse driving by the pulse signal S11 is started, and the generation operation of the output voltage VO1 by the output portion 11 is started. As a result of this, the output voltage VO1 begins to rise from the time point t24' and reaches a predetermined target value at a time point t25. Besides, if the pulse driving by the pulse signal S11 is started at the time point t24', the pulse detection signal S42 of the turning on/off circuit 40 is raised to the high level; accordingly, the output permission signal S43 also is raised to the high level, and the switch SW is turned on. As a result of this, the driving current ILED is supplied to the light emitting diode LED and the light emitting diode LED is turned on. In the meantime, a duration, which is required from the time the shutdown signal SDN is dropped to the low level to the time the output voltage VO1 reaches the predetermined target value, becomes constant irrespective of whether the turning on/off circuit 40 is provided with the pulse signal detection portion 43 or not.

As described above, the turning on/off circuit 40 is structured to monitor whether the output voltage VO1 is larger the threshold value voltage Vth1 or not, to monitor whether the generation operation of the output voltage VO1 is started in the power-supply circuit 10 or not, and to wait until the generation operation of the output voltage VO1 is started in the power-supply circuit 10 without turning on the driving current ILED even if the output voltage VO1 is larger than the threshold value voltage Vth1.

By employing such structure, it is possible to eliminate the start/stop (see the time points t22 to t23 of FIG. 7) unnecessary for the supply operation of the driving current ILED; accordingly, it becomes possible to eliminate the erroneous turning-on of the light emitting diode LED. Besides, the discharge transistor for the output voltage VO1 becomes unnecessary; therefore, it also becomes possible to achieve cost reduction by reducing the number of pins and the mount area.

Second Embodiment

Figure 9:
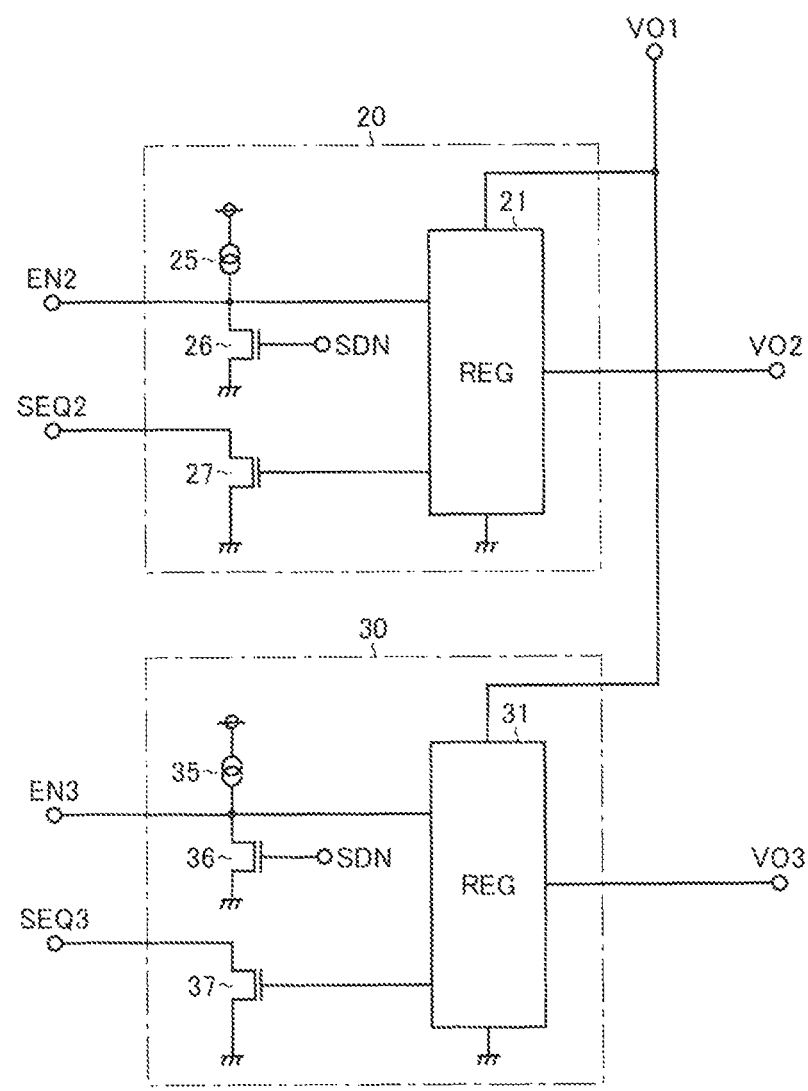
FIG. 9 is a main-portion structural diagram of power-supply circuits 20 and 30.

FIG. 9 is a main-portion structural diagram (especially, a structural portion for arbitrarily setting a startup sequence procedure) of the power-supply circuits 20 and 30. The power-supply circuits 20 and 30 of the present structural example each include: regulator portions 21 and 31; enable terminals EN2 and EN3; startup sequence setting terminals SEQ2 and SEQ3; electric current sources 25 and 35; N channel type MOS field effect transistors 26 and 36; and N channel type MOS field effect transistors 27 and 37.

The regulator portion 21 generates the output voltage VO2 from the output voltage VO1.

The enable terminal EN2 is an external terminal to which a startup permission signal for the regulator portion 21 is input. The regulator portion 21 goes to a startup permission state when the enable terminal EN2 is at a high level, and goes to a startup prohibition state when the enable terminal EN2 is at a low level.

The startup sequence setting terminal. SEQ2 is an external terminal that is used to output a startup completion signal from the regulator portion 21 as a startup permission signal for the power-supply circuit 30. The startup sequence setting terminal SEQ2 is kept at a low level until the startup of the regulator portion 21 is completed, and latched at a high level when the startup of the regulator portion 21 is completed.

The electric current source 25 is an active device that pulls up the enable terminal EN2 by running a minute current (about 10 μA) from a power-supply terminal to the enable terminal EN2.

The transistor 26 is a discharge transistor that performs connection/disconnection between the enable terminal EN2 and the ground terminal in accordance with the shutdown signal SDN. The transistor 26 is turned on when the shutdown signal SDN is at the high level, and turned off when the shutdown signal SDN is at the low level.

The transistor 27 is an open drain transistor that performs connection/disconnection between the startup sequence setting terminal SEQ2 and the ground terminal in accordance with the startup completion signal from the regulator portion 21. The transistor 27 is kept at an on-state until the startup of the regulator portion 21 is completed, and turned off when the startup of the regulator portion 21 is completed.

In the meantime, the structure of the power-supply circuit 30 is basically the same structure as the power-supply circuit 20, and the reference numbers "20", "21", "25" to "27", "30", "VO2", "EN2" and "SEQ2 in the above description are respectively replaced with "30", "31", "35" to "37", "20", "VO3", "EN3" and "SEQ3" to sufficiently understand.

Figure 10:
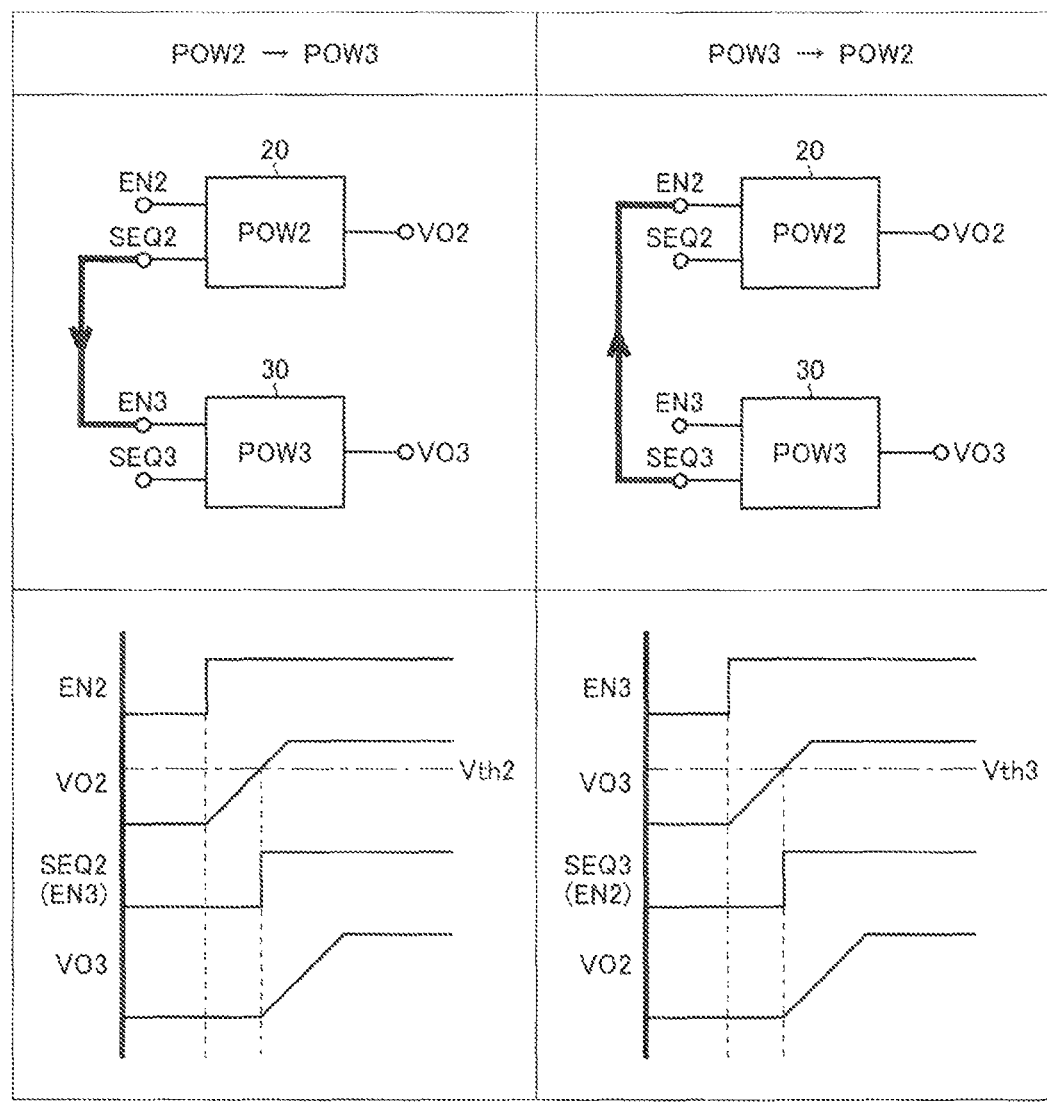
FIG. 10 is a diagram showing a relationship between a pin connection state and a startup sequence.

FIG. 10 is a diagram showing a relationship between a pin connection state and a startup sequence. As shown in this figure, in a case where the power-supply circuit 30 is started up after the power-supply circuit 20 is started up, the startup sequence setting terminal SEQ2 and the enable terminal EN3 are connected to each other. By performing such pin connection, it becomes possible to achieve a startup sequence comprising a series of operations as follows: when the enable terminal EN2 is raised to the high level, the output voltage VO2 begins to rise; and when the output voltage VO2 reaches a threshold value voltage Vth2, the startup sequence setting terminal SEQ2 goes to the high level; further, the enable terminal EN3 goes to the high level, and the output voltage VO3 begins to rise.

On the other hand, reversely to the above description, in a case where the power-supply circuit 20 is started up after the power-supply circuit 30 is started up, the startup sequence setting terminal SEQ3 and the enable terminal EN2 are connected to each other. By performing such pin connection, it becomes possible to achieve a startup sequence comprising a series of operations as follows: when the enable terminal EN3 is raised to the high level, the output voltage VO3 begins to rise; and when the output voltage VO3 reaches a threshold value voltage Vth3, the startup sequence setting terminal SEQ3 goes to the high level; further, the enable terminal EN2 goes to the high level, and the output voltage VO2 begins to rise.

As described above, in the second embodiment, between the power-supply circuit 20 and the power-supply circuit 30, the special terminals (startup sequence setting terminals SEQ2 and SEQ3) for outputting the startup completion signal from one to the other are disposed. By employing such structure, it becomes possible for a user to achieve an arbitrary startup sequence by only connecting the startup sequence setting terminal SEQ2 and the enable terminal EN3 to each other, or connecting the startup sequence setting terminal SEQ3 and the enable terminal EN2 to each other. Therefore, it becomes possible to raise universality of the power-supply device 1 compared with a custom IC in which the startup sequence is fixed. Besides, it also becomes possible to achieve reductions in the mount area and cost compared with a structure in which the startup procedure is changed by using discrete components such as a resistor, a capacitor and the like.

In the meantime, it is sufficient for each of the transistors 27 and 37 to have an electric current capability for pulling out the minute current generated by the electric current sources 35 and 25; accordingly, unlike a structure in which an arbitrary pull-up resistor is externally connected, it becomes possible to design its device size (electric current capability) to have the smallest possible size.

Besides, as shown in FIG. 1 described above, the power-supply circuits 20 and 30 each are provided with power good terminals PG2 and PG3 that output a power good signal, which imparts whether the output operations of the regulator portions 21 and 31 are usual or not, to outside of the power-supply device 1. By employing such structure, by using a microcomputer and the like disposed outside the power-supply device 1, it becomes possible to monitor the operation state of the power-supply device 1.

In the meantime, it is also possible to perform the above startup sequence setting by using the power good terminals PG2 and PG3, but there are many cases where the voltage level suitable to be input to the enable terminals EN2 and EN3 and the voltage level suitable to be input to the microcomputer are not equal to each other; accordingly, it is impossible to easily use the power good terminals PG2 and PG3 for that purpose.

Besides, unlike the power good terminals PG2 and PG3, the startup sequence setting terminals SEQ2 and SEQ3 are not universal terminals for outputting a signal to the outside of the power-supply device 1; accordingly, there is only slight constraint on the pin arrangement. Therefore, for example, it is possible to perform an arbitrary pin arrangement by adjacently disposing the enable terminals EN2 and EN3 and the startup sequence setting terminals SEQ2 and SEQ3.

Third Embodiment

Figure 11:
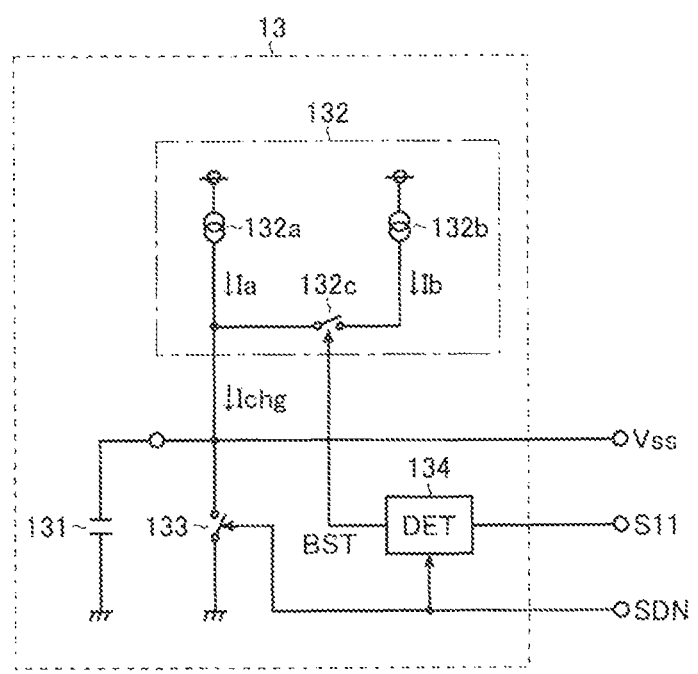
FIG. 11 is a circuit diagram showing a structural example of a soft start voltage generation portion 13.

FIG. 11 is a circuit diagram showing a structural example of the soft start voltage generation portion 13. The soft start voltage generation portion 13 of the present structural example includes: a capacitor 131; a charge current generation portion 132; a discharge switch 133; and a pulse signal detection portion 134.

The capacitor 131 is connected between the application, terminal for the soft start voltage Vss and the ground terminal, and a charge voltage appearing at one terminal of the capacitor 131 is output as the soft start voltage Vss.

The charge current generation portion 132 is a circuit block that generates a charge current Ichg for the capacitor 131, and includes: electric current sources 132a and 132b; and a switch 132c.

The electric current source 132a is connected to one terminal of the capacitor 131, generates an electric current Ia and supplies it to the capacitor 131.

The electric current source 132b is connected to the one terminal of the capacitor 131 via the switch 132c, generates an electric current Ib and supplies it to the capacitor 131.

The switch 132c is connected between the capacitor 131 and the electric current source 132b, is turned on when a boost signal BST is at a low level, and turned off when the boost signal BST is at a high level. In other words, the switch 132c performs switching to output, as the charge current Ichg for the capacitor 131, a summed current of the electric current Ia and the electric current Ib or to output the electric current Ia only.

In the meantime, like the above pulse detection signals S22 and S32, the above boost signal BST is a signal that rises to the high level at a time the pulse driving by the pulse signal S11 is started. Therefore, it is sayable that the above charge current generation portion 131 has a structure which boosts the charge current Ichg to an electric value (=Ia+Ib) that is increased from a usual value (=Ia) before detection of the pulse signal S11 and returns the charge current Ichg to the usual value (=Ia) after the detection of the pulse signal S11.

The discharge switch 133 is connected between the application terminal for the soft start voltage Vss and the ground terminal, is turned on when the shutdown signal SDN is raised to the high level, and discharges electric charges stored in the capacitor 131.

The pulse signal detection portion 134 detects the pulse signal S11 for driving the transistor P1 to generate the boost signal BST (which corresponds to the above pulse detection signals S22 and S32). The boost signal BST is triggered by a falling edge (or rising edge) of the pulse signal S11 to be latched at the high level. Besides, the boost signal BST is triggered by a rising edge of the shutdown signal SDN to be latched at the low level. In other words, the boost signal BST goes to the high level when the generation operation of the output voltage VO1 is started in the power-supply circuit 10, and goes to the low level when the power-supply device 1 is shut down. In the meantime, in the present structural example, the pulse signal S11 is targeted for monitoring, but it is also possible to target the pulse signals S10 and S12 for monitoring. As the pulse signal detection portion 134, an SR flip-flop and the like may be used.

Figure 12:
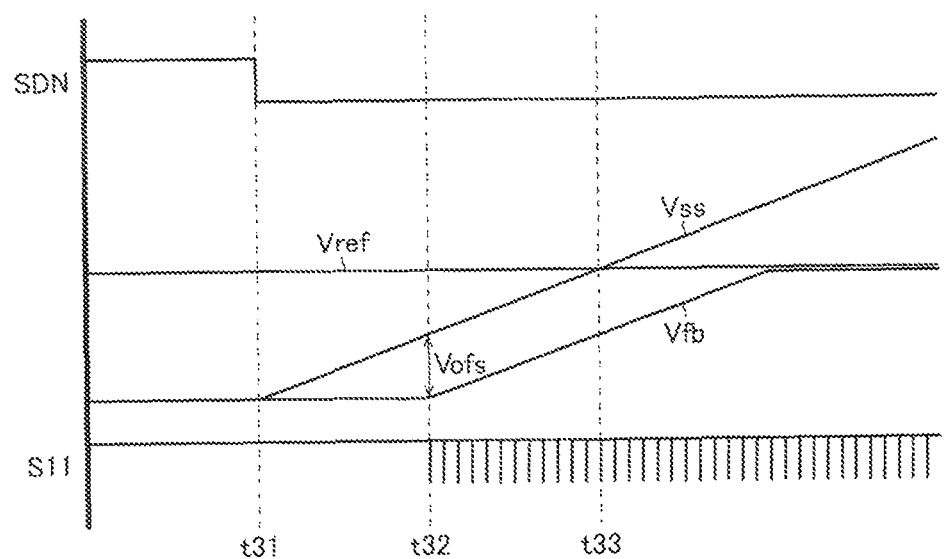
FIG. 12 is a time chart showing a first example (with no boost) of a soft start operation.
Figure 13:
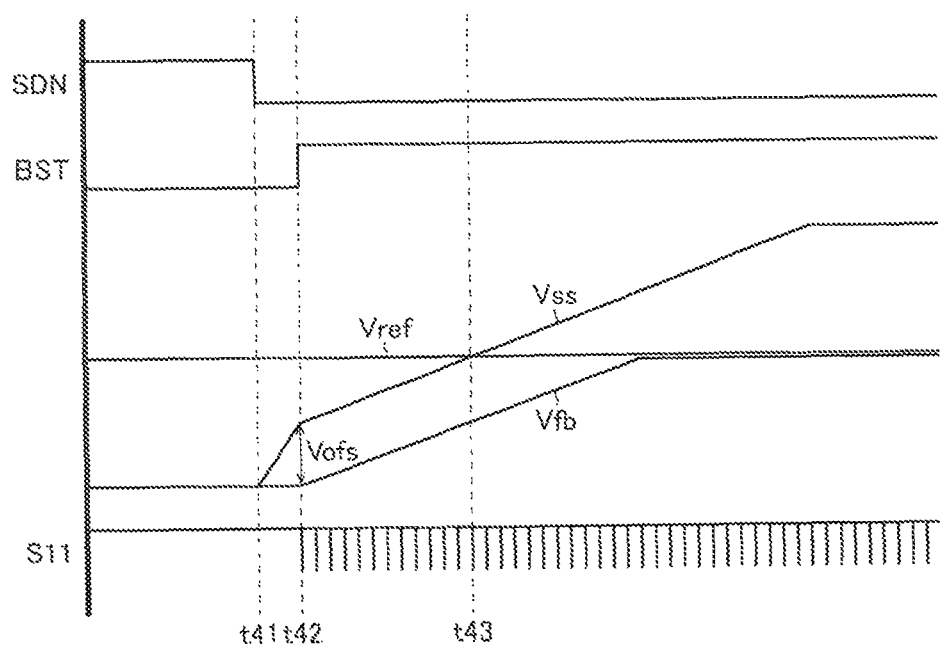
FIG. 13 is a time chart showing a second example (with a boost) of the soft start operation.

Next, the significance of performing the boost operation of the soft start voltage Vss is described comparing and referring to FIG. 12 and FIG. 13.

First, referring to FIG. 12, the soft start operation with no boost (case where the soft start voltage generation portion 13 is not provided with the electric current source 132b, the switch 132c, and the pulse signal detection portion 134) is described as a comparative example. FIG. 12 is a time chart showing a first example (with no boost) of the soft start operation, and in order from top, illustrates: the shutdown signal SDN; various voltages (the soft start voltage Vss, the reference voltage Vref, and the feedback voltage Vfb) of the power-supply circuit 10; and the pulse signal S11.

At a time point t31, if the shutdown signal SDN is dropped to the low level, the discharge switch 133 is turned off and a charge by the electric current Ichg (=Ia) to the capacitor 131 is started; accordingly, the soft start voltage Vss begins to rise gradually. But, at this time point, a difference between the soft start voltage Vss and the feedback voltage Vfb is lower than an input offset value Vofs of the error amplifier 14; therefore, the pulse driving by the pulse signal S11 is still stopped and the feedback voltage Vfb is kept at the lower limit value (0 V).

At a time point t32, if the difference between the soft start voltage Vss and the feedback voltage Vfb becomes larger than the input offset value Vofs of the error amplifier 14, the pulse driving by the pulse signal S11 is started and the feedback voltage Vfb begins to rise gradually.

Thereafter, the soft start voltage Vss keeps rising to become larger than the reference voltage Vref at a time point t33. Accordingly, output feedback control is performed until the time point t33 such that the soft start voltage Vss and the feedback voltage Vfb become equal to each other, and after the time point t33, the output feedback control is performed such that the reference voltage Vref and the feedback voltage Vfb become equal to each other.

As described above, according to the structure in which the pulse driving by the pulse signal S11 is kept stopped until the difference between the soft start voltage Vss and the feedback voltage Vtb becomes larger than the input offset value Vofs of the error amplifier 14, it is possible to prevent an unusual output (unintentional impulse output of the output voltage VO1 and the like) at the startup time. But, in a case where the above structure is employed, there is a problem that the soft start duration becomes long unnecessarily.

In the meantime, if the electric current value of the charge current Ichg (=Ia) is set larger, it is possible to shorten the soft start duration by raising the soft start voltage Vss more rapidly, but if the electric current value of the charge current Ichg is set too large, there is a risk that an effect of alleviating a rush current and an output overshoot could be impaired.

Besides, if the input offset value Vofs of the error amplifier 14 is set smaller, it is possible to shorten the soft start duration by starting the pulse driving by the pulse signal S11 at an earlier timing, but if the input offset value Vofs is set too small, there is a risk that an unusual output prevention effect at the startup time could be impaired. Besides, for example, in a case where a comparator for confirming the soft start voltage Vss is reset to the lower limit value (0 V) at the shutdown time of the power-supply device 1 is disposed, it is necessary to set a threshold voltage of the comparator to a value lower than the input offset value Vofs of the error amplifier 14. Because of this, if the above input offset value Vofs is set too small, it is necessary to set the threshold voltage of the above comparator to be near 0 V; accordingly, there is a problem that noise resistance deteriorates.

Next, referring to FIG. 13, the soft start operation with a boost is described. FIG. 13 is a time chart showing a second example (with a boost) of the soft start operation, and in order from top, illustrates: the shutdown signal SDN; the boost signal BST; various voltages (the soft start voltage Vss, the reference voltage Vref, and the feedback voltage Vfb) of the power-supply circuit 10; and the pulse signal S11.

At a time point t41, if the shutdown signal SDN is dropped to the low level, the discharge switch 133 is turned off and a charge by the electric current Ichg to the capacitor 131 is started. But, at this time point, a difference between the soft start voltage Vss and the feedback voltage Vfb is lower than the input offset value Vofs of the error amplifier 14; accordingly, the pulse driving by the pulse signal S11 is still stopped and the feedback voltage Vfb is kept at the lower limit value (0 V).

Besides, at the time point t41, the pulse driving by the pulse signal S11 is kept stopped; accordingly, the boost signal BST is kept at the low level, and the switch 132c is in the on-state. Therefore, a summed current (=Ia+Ib) of the electric currents Ia and Ib is output as the charge current Ichg for the charge capacitor 131 from the charge current generation portion 132; therefore, the soft start voltage Vss begins to rise sharply at a first inclination.

At a time point t42, if the difference between the soft start voltage Vss and the feedback voltage Vfb becomes larger than the input offset value Vofs of the error amplifier 14, the pulse driving by the pulse signal S11 is started; accordingly, the feedback voltage Vfb begins to rise. Besides, at the time point t42, because the pulse driving by the pulse signal S11 is started, the boost signal BST is raised to the high level and the switch 132c is turned off. Accordingly, after the time point t42, the charge current generation portion 132 goes to a state to output the electric current Ia only as the charge current Ichg for the capacitor 131. In other words, the boost operation of the soft start voltage Vss is terminated at the time the pulse driving by the pulse signal S11 is detected; after the time point t42, the soft start voltage Vss goes to a state to keep rising at a second inclination that is more gradual than the first inclination.

Thereafter, the soft start voltage Vss keeps rising gradually to become larger than the reference voltage Vref at a time point t43. Accordingly, the output feedback control is performed until the time point t43 such that the soft start voltage Vss and the feedback voltage Vfb become equal to each other, and after the time point t43, the output feedback control is performed such that the reference voltage Vref and the feedback voltage Vfb become equal to each other.

As described above, the soft start voltage generation portion 13 is structured to raise the soft start voltage Vss at the first inclination before the detection of the pulse signal S11, and to raise the soft start voltage Vss at the second inclination more gradual than the first inclination after the detection of the pulse signal S11. In other words, the soft start voltage generation portion 13 is structured to raise the soft start voltage Vss more sharply than usual from the time the power-supply circuit 10 is started up to the time the generation operation of the output voltage VO1 by the output portion 11 is started. According to such structure, it becomes possible to shorten the soft start duration without impairing the effect of alleviating a rush current and an output overshoot.

Besides, according to the above structure, it becomes easy to set large the input offset value Vofs of the error amplifier; accordingly, it becomes possible to raise more the unusual output prevention effect at the startup time. Besides, in a case where a comparator for confirming the soft start voltage Vss is reset to the lower limit value (0 V) at the shutdown time of the power-supply device 1 is disposed, it becomes possible to set a higher threshold voltage of the comparator; accordingly, it becomes possible to improve the noise resistance.

Vehicle-Mounted Device

Figure 14:
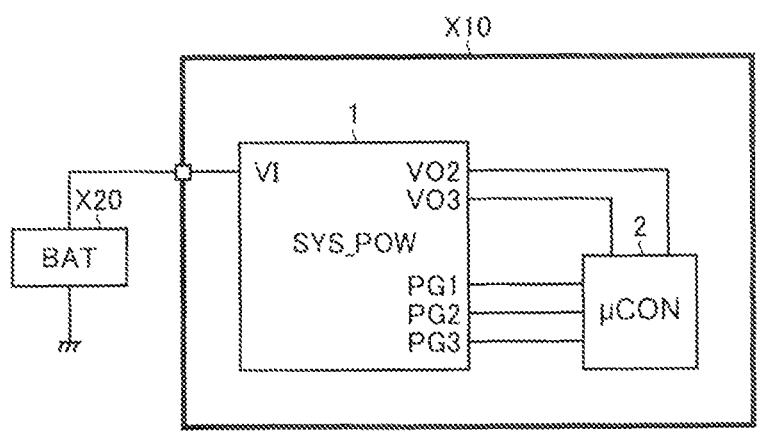
FIG. 14 is a block diagram showing a structural example of a vehicle-mounted device that incorporates a power-supply device.

FIG. 14 is a block diagram showing a structural example of a vehicle-mounted device that incorporates the power-supply device. A vehicle-mounted device X10 of the present structural example has the power-supply device 1 and a microcomputer 2. The power-supply device 1 is the system power-supply IC of FIG. 1, converts the input voltage VI supplied from a battery X20 into the output voltages VO2 and VO3 and supplies them to the microcomputer 2. The microcomputer 2 receives the output voltages VO2 and VO3 supplied from the power-supply device 1 to operate and controls comprehensively operation of the vehicle-mounted device X10. Besides, the microcomputer 2 is provided with a function to monitor the startup completion signals PG1 to PG3 from the power-supply device 1. In the meantime, the output voltage VO2 is supplied to an I/O [input/output] block of the microcomputer 2, while the output voltage VO3 is supplied to a core block of the microcomputer 2.

Vehicle

Figure 15:
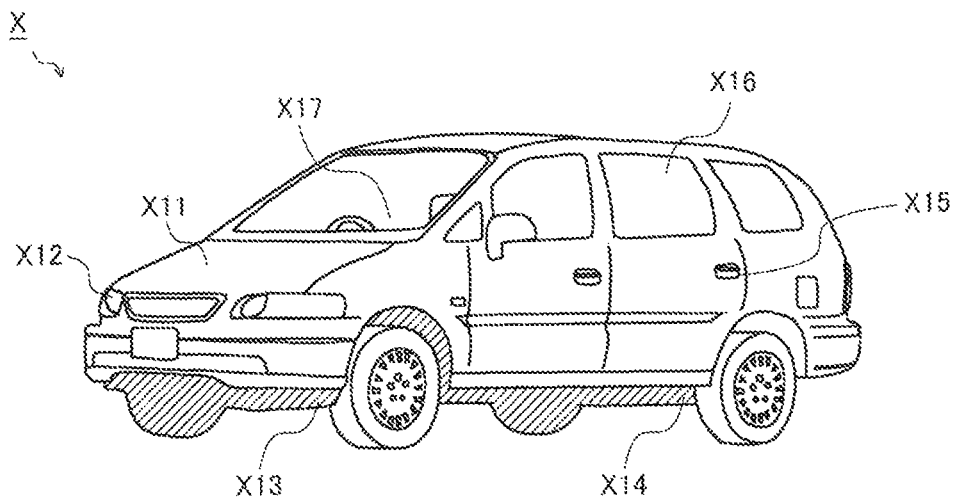
FIG. 15 is an appearance view showing a structural example of a vehicle that incorporates the vehicle-mounted device.

FIG. 15 is an appearance view showing a structural example of a vehicle that incorporates the vehicle-mounted device. A vehicle X of the present structural example incorporates vehicle-mounted devices X11 to X17 and a battery (see battery X20 in FIG. 14) that supplies electric power to these vehicle-mounted devices X11 to X17.

The vehicle-mounted device X11 is an engine control unit that performs control (injection control, electronic throttle control, idling control, oxygen sensor heater control, auto cruise control and the like) related to an engine.

The vehicle-mounted device X12 is a lamp control unit that performs turning on/off control of a HID [high intensity discharged lamp], a DRL [daytime running lamp] and the like.

The vehicle-mounted device X13 is a transmission control unit that performs control related to transmission.

The vehicle-mounted device X14 is a body control unit that performs control (ABS [anti-lock brake system] control, EPS [electric power Steering] control, electronic suspension control and the like) related to movement of the vehicle X.

The vehicle-mounted device X15 is a security control unit that performs driving control of a door lock, a security alarm and the like.

The vehicle-mounted device X16 is an electronic device that is built in the vehicle X on the factory shipment stage as a standard product or a maker option product such as a wiper, an electric door mirror, a power window, an electric sunroof, an electric seat, an air conditioner and the like.

The vehicle-mounted device X17 is an electronic device such as a vehicle A/V [audio/visual] device, a car navigation system, an ETC [Electronic Toll Collection System] and the like that is mounted on the vehicle X in accordance with a user's option.

In the meantime, the above vehicle-mounted device X17 is an example of the vehicle-mounted device X10 shown in FIG. 14, and the power-supply device 1 described above is buildable in any of the vehicle-mounted devices X11 to X17.

Summing Up

Hereinafter, the various inventions disclosed in the present specification are summed up.

The power-supply device disclosed in the present specification has the structure (the 1-1 structure) which has a first power-supply circuit that generates a first output voltage from an input voltage; and a second power-supply circuit that generates a second output voltage from the first output voltage, wherein the second power-supply circuit monitors whether the first output voltage is larger than a first threshold value voltage or not, monitors whether a generation operation of the first output voltage is started in the first power-supply circuit or not, and waits until the generation operation of the first output voltage is started in the first power-supply circuit without starting a generation operation of the second output voltage even if the first output voltage is larger than the first threshold value voltage.

In the meantime, the power-supply device having the above 1-1 structure may have the structure (the 1-2 structure), in which the first power-supply circuit includes an output portion that drives a switch device to generate the first output voltage from the input voltage; and the second power-supply circuit includes a pulse signal detection portion that detects a pulse signal for driving the switch device.

Besides, the power-supply device having the above 1-2 structure may have the structure (the 1-3 structure), in which the first power-supply circuit includes: a feedback voltage generation portion that generates a feedback voltage in accordance with the first output voltage; a soft start voltage generation portion that generates a soft start voltage which rises gradually after a startup; an error amplifier that generates an error voltage in accordance with a difference between a lower one of a predetermined reference voltage and the soft start voltage and the feedback voltage; a slope voltage generation portion that generates a serrate or triangular slope voltage; and a pulse signal generation portion that generates the pulse signal in accordance with a comparison result between the error voltage and the slope voltage.

Besides, the power-supply device having any one of the above 1-1 to 1-3 structures may have the structure (the 1-4 structure) which further has a third power-supply circuit that generates a third output voltage from the first output voltage.

Besides, the power-supply device having the above 1-4 structure may have the structure (the 1-5 structure), in which the second power-supply circuit and the third power-supply supply circuit each include: a regulator portion; a first terminal to which a startup permission signal for the regular portion is input; and a second terminal that is used when an startup completion signal from the regulator portion is output as a startup permission signal for another power-supply circuit.

Besides, the power-supply device having the above 1-5 structure may have the structure (the 1-6 structure), in which the second power-supply circuit and the third power-supply circuit each include: an electric current source that pulls up the first terminal; and an open drain transistor that performs connection/disconnection between the second terminal and a ground terminal.

Besides, the power-supply device having the above 1-6 structure may have the structure (the 1-7 structure), in which the second power-supply circuit and the third power-supply circuit each include: a discharge transistor that performs connection/disconnection between the first terminal and the ground terminal.

Besides, the power-supply device having any one of the above 1-5 to 1-7 structures may have the structure (the 1-8 structure), in which the second power-supply circuit and the third power-supply circuit each include: a third terminal, that outputs a power good signal, which indicates whether an output operation of the regulator portion is usual or not, to outside of the power-supply device.

Besides, the vehicle-mounted device disclosed in the present specification has the structure (the 1-9 structure) which has: the power-supply device having any one of the above 1- to 1-8 structures; and a microcomputer that receives an output voltage from the power-supply device to operate.

Besides, the vehicle disclosed in the present specification has the structure (the 1-10 structure) which has: the vehicle-mounted having the above 1-9 structure; and a battery that supplies electric power to the vehicle-mounted device.

Besides, the power-supply device disclosed in the present specification has the structure (the 1-11 structure) which has a power-supply circuit that generates an output voltage from an input voltage and supplies the output voltage to a light emitting diode; and a turning on/off circuit that turns on/off a driving current for the light emitting diode, wherein the turning on/off circuit monitors whether the output voltage is larger than a predetermined threshold value voltage or not, monitors a generation operation of the output voltage is started in the power-supply circuit or not, and waits until the generation operation of the output voltage is started in the power-supply circuit without turning on the driving current even if the output voltage is larger than the threshold value voltage.

In the meantime, the power-supply device having the above 1-11 structure may have the structure (the 1-12 structure), in which the power-supply circuit includes an output portion that drives a switch device to generate the output voltage from the input voltage; and the turning on/off circuit includes a pulse signal detection portion that detects a pulse signal for driving the switch device.

Besides, the power-supply device having the above 1-12 structure may have the structure (the 1-13 structure), in which the power-supply circuit includes: a feedback voltage generation portion that generates a feedback voltage in accordance with the output voltage; a soft start voltage generation portion that generates a soft start voltage which rises gradually after a startup; an error amplifier that generates an error voltage in accordance with a difference between a lower one of a predetermined reference voltage and the soft start voltage and the feedback voltage; a slope voltage generation portion that generates a serrate or triangular slope voltage; and a pulse signal generation portion that generates the pulse signal in accordance with a comparison result between the error voltage and the slope voltage.

Besides, the power-supply device disclosed in the present specification has the structure (the 2-1 structure) which has: an output portion that drives a switch device to generate the output voltage from the input voltage; a feedback voltage generation portion that generates a feedback voltage in accordance with the output voltage; a soft start voltage generation portion that generates a soft start voltage which rises gradually after a startup; an error amplifier that generates an error voltage in accordance with a difference between a lower one of a predetermined reference voltage and the soft start voltage and the feedback voltage; a slope voltage generation portion that generates a serrate or triangular slope voltage; and a pulse signal generation portion that generates the pulse signal for driving the switch device in accordance with a comparison result between the error voltage and the slope voltage, wherein the soft start voltage generation portion includes a pulse signal detection portion that detects the pulse signal; the soft start voltage is raised at a first inclination before detection of the pulse signal; and the soft start voltage is raised at a second inclination more gradual than the first inclination after the detection of the pulse signal.

In the meantime, the power-supply device having the above 2-1 structure may have the structure (the 2-2 structure), in which the error amplifier keeps the error voltage at a lower limit value until a difference between the soft start voltage and the feedback voltage becomes larger than a predetermined input offset value.

Besides, the power-supply device having the above 2-2 structure may have the structure (the 2-3 structure), in which a lower limit value of the slope voltage is higher than the lower limit value of the error voltage.

Besides, the power-supply device having the above 2-3 structure may have the structure (the 2-4 structure), in which the soft start voltage generation portion includes: a capacitor whose charge voltage is output as the soft start voltage; a charge current generation portion that generates a charge current for the capacitor; and a discharge switch that discharges the capacitor, wherein the charge current generation portion makes the charge current larger than a usual value before detection of the pulse signal, and returns the charge current to the usual value after the detection of the pulse signal.

Besides, the power-supply device having the 2-4 structure may have the structure (the 2-5 structure), in which the charge current generation portion includes: a first current source that generates a first current; a second current source that generates a second current; and a switch that performs switching whether the second current is to be added to the first current in accordance with a detection result from the pulse signal detection portion or not, wherein a summed current of the first current and the second current is output as the charge current before detection of the pulse signal, and the first current only is output as the charge current after the detection of the pulse signal.

Besides, the vehicle-mounted device disclosed in the present specification has the structure (the 2-6 structure) which has: the power-supply device having any one of the above 2-1 to 2-5 structures; and a microcomputer that receives an output voltage from the power-supply device to operate.

Besides, the vehicle disclosed in the present specification has the structure (the 2-10 structure) which has: the vehicle-mounted device having the above 2-6 structure; and a battery that supplies electric power to the vehicle-mounted device.

Other Modifications

In the meantime, in the above embodiments, the structures which applies the present invention to the vehicle-mounted system power-supply IC are described as examples, but the application target of the present invention is not limited to these, and the present invention is also widely applicable to power-supply devices that are used for other applications.

Besides, in the above first to third embodiments, all the structures may be applied at the same time or only a necessary structure may be applied independently. For example, in a power-supply device that includes a single power-supply circuit, the above third embodiment only is also applicable.

Besides, the various technological features disclosed in the present specification, besides the above embodiments, are variously modifiable without departing from the spirit of the technological creation. For example, mutual replacement between the bipolar transistor and the MOS field effect transistor and logical level inversions of the various signals are arbitrary. In other words, it should be understood that the above embodiments are examples in all respects and not limiting, and the technological scope of the present invention is not indicated by the above description of the embodiments but by the claims, and all modifications within the scope of the claims and meaning equivalent to the claims are covered.

INDUSTRIAL APPLICABILITY

The present invention is applicable, for example, to a vehicle-mounted system power-supply IC. But the application target of the present invention is not limited to this, and the present invention is also widely applicable to power-supply devices that are used for other applications.

LIST OF REFERENCE NUMERALS

1 power-supply device (system power-supply IC)
2 microcomputer
10, 20, 30 power-supply circuits
40 turning on/off circuit
11 output portion
12 feedback voltage generation portion
13 soft start voltage generation portion
131 capacitor
132 charge current generation portion
132a, 132b electric current sources
132c switch
133 discharge switch
134 pulse signal detection portion
14 error amplifier
15 slope voltage generation portion
16 comparator
17 control portion
21, 31 regulator portions
41 switch control portion
22, 32, 42 comparators
23, 33, 43 pulse signal detection portions
24, 34, 44 AND gates
25, 35 electric current sources
26, 27, 36, 37 N channel type MOS field effect transistors
P1 P channel type MOS field effect transistor
N1 N channel type MOS field effect transistor
L1 coil
D1, D2 diodes
C1 capacitor
R1, R2 resistors
LED light emitting diode
SW switch (N channel type MOS field effect transistor)
X vehicle
X10, X11 to X17 vehicle-mounted devices
X20 battery

What is claimed is:

1. A power-supply device comprising:
a first power-supply circuit that generates a first output voltage from an input voltage; and
a second power-supply circuit that generates a second output voltage from the first output voltage, wherein
the second power-supply circuit includes:
a comparator that monitors whether the first output voltage is larger than a first threshold value voltage or not;
a pulse signal detection portion that monitors a pulse signal for generating the first output voltage in the first power-supply circuit; and
an output permission signal generation portion that waits until the pulse signal is detected in the pulse signal detection portion circuit without starting a generation operation of the second output voltage even if the first output voltage is larger than the first threshold value voltage in the comparator.

2. The power-supply device according to claim 1, wherein the first power-supply circuit includes an output portion that drives a switch device to generate the first output voltage from the input voltage.

3. The power-supply device according to claim 2, wherein the first power-supply circuit includes:
a feedback voltage generation portion that generates a feedback voltage in accordance with the first output voltage;
a soft start voltage generation portion that generates a soft start voltage which rises gradually after a startup;
an error amplifier that generates an error voltage in accordance with a difference between a lower one of a predetermined reference voltage and the soft start voltage and the feedback voltage;
a slope voltage generation portion that generates a serrate or triangular slope voltage; and
a pulse signal generation portion that generates the pulse signal in accordance with a comparison result between the error voltage and the slope voltage.

4. The power-supply device according to claim 1, further comprising
a third power-supply circuit that generates a third output voltage from the first output voltage.

5. The power-supply device according to claim 4, wherein the second power-supply circuit and the third power-supply circuit each include:
a regulator portion;
a first terminal to which a startup permission signal for the regular portion is input; and
a second terminal that is used when an startup completion signal from the regulator portion is output as a startup permission signal for another power-supply circuit.

6. The power-supply device according to claim 5, wherein the second power-supply circuit and the third power-supply circuit each include:
an electric current source that pulls up the first terminal; and
an open drain transistor that performs connection/disconnection between the second terminal and a ground terminal.

7. The power-supply device according to claim 6, wherein the second power-supply circuit and the third power-supply circuit each include:
a discharge transistor that performs connection/disconnection between the first terminal and the ground terminal.

8. The power-supply device according to claim 5, wherein the second power-supply circuit and the third power-supply circuit each include:
a third terminal that outputs a power good signal, which indicates whether an output operation of the regulator portion is usual or not, to outside of the power-supply device.

9. A vehicle-mounted device comprising:
the power-supply device described in claim 1; and
a microcomputer that receives an output voltage from the power-supply device to operate.

10. A vehicle comprising:
the vehicle-mounted device described in claim 9; and
a battery that is connected to the vehicle-mounted device and supplies electric power to the vehicle-mounted device.

11. A power-supply device comprising:
a power-supply circuit that generates an output voltage from an input voltage and supplies the output voltage to a light emitting diode; and
a turning on/off circuit that turns on/off a driving current for the light emitting diode, wherein
the turning on/off circuit includes:
a comparator that monitors whether the output voltage is larger than a predetermined threshold value voltage or not;
a pulse signal detection portion that monitors a pulse signal for generating the output voltage in the power-supply circuit or not; and
an output permission signal generation portion that waits until the pulse signal is detected in the pulse signal detection portion without turning on the driving current even if the output voltage is larger than the threshold value voltage in the comparator.

12. The power-supply device according to claim 11, wherein
the power-supply circuit includes an output portion that drives a switch device to generate the output voltage from the input voltage.

13. The power-supply device according to claim 12, wherein
the power-supply circuit includes:
a feedback voltage generation portion that generates a feedback voltage in accordance with the output voltage;
a soft start voltage generation portion that generates a soft start voltage which rises gradually after a startup;
an error amplifier that generates an error voltage in accordance with a difference between a lower one of a predetermined reference voltage and the soft start voltage and the feedback voltage;
a slope voltage generation portion that generates a serrate or triangular slope voltage; and
a pulse signal generation portion that generates the pulse signal in accordance with a comparison result between the error voltage and the slope voltage.

* * * * *